United States Patent [19]
Huang

[11] Patent Number: 5,408,351
[45] Date of Patent: Apr. 18, 1995

[54] OPTICAL COMMUNICATION SYSTEM

[75] Inventor: Alan Huang, Middletown, N.J.

[73] Assignee: AT&T Corp., Murray Hill, N.J.

[21] Appl. No.: 961,606

[22] Filed: Oct. 15, 1992

[51] Int. Cl.$^6$ ........................................... H04B 10/00
[52] U.S. Cl. .................................. 359/186; 359/140;
359/184; 370/8; 375/239; 327/31; 327/172
[58] Field of Search .......................... 370/8; 375/23;
307/265-267, 518; 328/109, 111, 112; 359/135,
140, 184, 186

[56] References Cited
U.S. PATENT DOCUMENTS

| | | | |
|---|---|---|---|
| 4,377,006 | 3/1983 | Collins et al. | 455/603 |
| 4,397,042 | 8/1983 | Tsujii | 359/181 |
| 4,442,532 | 4/1984 | Takemura | 328/109 |
| 4,497,068 | 1/1985 | Fischer | 359/186 |
| 4,567,601 | 1/1986 | Mountain | 328/111 |
| 4,694,504 | 9/1987 | Porter et al. | 455/608 |
| 5,144,375 | 9/1992 | Gabriel et al. | 356/345 |

OTHER PUBLICATIONS

Y. Takasaki, "Multiplexing and transmission systems for all-optical networks," Proceedings IEEE International Conference on Communications ICC '90, Georgia, USA, vol. 4, Apr. 15, 1990, pp. 1668-1672.
M. Jinno et al, "All-optical regenerator based on non-linear fibre sagnac interferometer," Electronic Letters, vol. 28, No. 14, Jul. 22, 1992, pp. 1350-1352.
J. D. Dennison et al, "Low-cost communications network," IBM Technical Disclosure Bulletin, vol. 17, No., 3, Aug. 1974, pp. 716-723.
J. Domer et al, "Mehr Platz auf dem Lichtwellenleiter," Telcom Report, vol. 12, No. 6, Nov. 1989, pp. 192-195.
M. Subbiah, et al. "Bit Error Rate for Narrowband Pulse Delay Binary Laser Communication System", IEEE Transactions on Aerospace and Electronic Systems, vol. AES-14, No. 2, Mar. 1978.
Dance, "Multchannel Remote Control Systems" Electron No. 153 pp. 33-34, 37 Nov. 7, 1978.

Primary Examiner—Leslie Pascal
Attorney, Agent, or Firm—John A. Caccuro

[57] ABSTRACT

An optical communication system includes an optical transmitter which transmits data symbols as pairs of optical pulses having 1) a first predetermined time separation representing a first inputted signal and 2) a second predetermined time separation representing a second inputted signal. The first optical pulse of each pair of pulses may be synchronized to a clock signal of the transmitter. The clock signal operates at a rate which insures that the inter-data symbol spacing is greater than the spacing between the pulses of a symbol pulse pair. The receiver generates a first output signal in response to a pair of pulses having a first predetermined time separation and generates a second output signal in response to a pair of pulses having a second predetermined time separation. The receiver combines the first and second output signal to recover a clock or strobe signal. Sagnac switches are used to implement optical AND circuits utilized in the transmitter and receiver.

26 Claims, 3 Drawing Sheets

OPTICAL COMMUNICATION SYSTEM

BACKGROUND OF THE INVENTION

This invention relates to optical communication circuits and, more particularly, to an all-optical transmitter and receiver for use in an optical communication system.

In prior art optical communication systems, the data transmission rate may be maximized by minimizing the bandwidth utilized for the transmission of control signals (clock synchronization, framing, etc.) necessary to recover the transmitted data. Such a requirement usually results in system designs which operate synchronously (rather than asynchronously) and which usually require elaborate clock recovery circuitry. The clock recovery circuits required in such synchronous designs tend to be complex, expensive and often unable to operate reliably at increasing optical data communication rates.

SUMMARY OF THE INVENTION

I have recognized that with the increasingly shorter optical pulses being used for optical communications providing enormous bandwidth, it is not necessary to minimize the control signal bandwidth, at the expense of increased receiver and transmitter complexity, to optimize data transmission bandwidth.

In accordance with the present invention, an optical communication system includes an optical transmitter which transmits data symbols as pairs of optical pulses having 1) a first predetermined time separation representing a first inputted signal and 2) a second predetermined time separation representing a second inputted signal. The time between symbol transmission is greater than either the first or the second predetermined time separation. The transmission of one optical pulse of each pair of pulses may be synchronized to a clock signal of the transmitter.

The system receiver generates a first output signal in response to a pair of pulses having a first predetermined time separation and generates a second output signal in response to a pair of pulses having a second predetermined time separation. The receiver, by combining the first and second output signals, may recover a clock or strobe signal.

Sagnac switches may be used to implement optical AND circuits utilized in the transmitter and receiver.

DETAILED DESCRIPTION

In the following description, each item or block of each figure has a reference designation associated therewith, the first number of which refers to the figure in which that item is first located (e.g., 110 is located in FIG. 1 and step 320 is located in FIG. 3).

Figure 1:
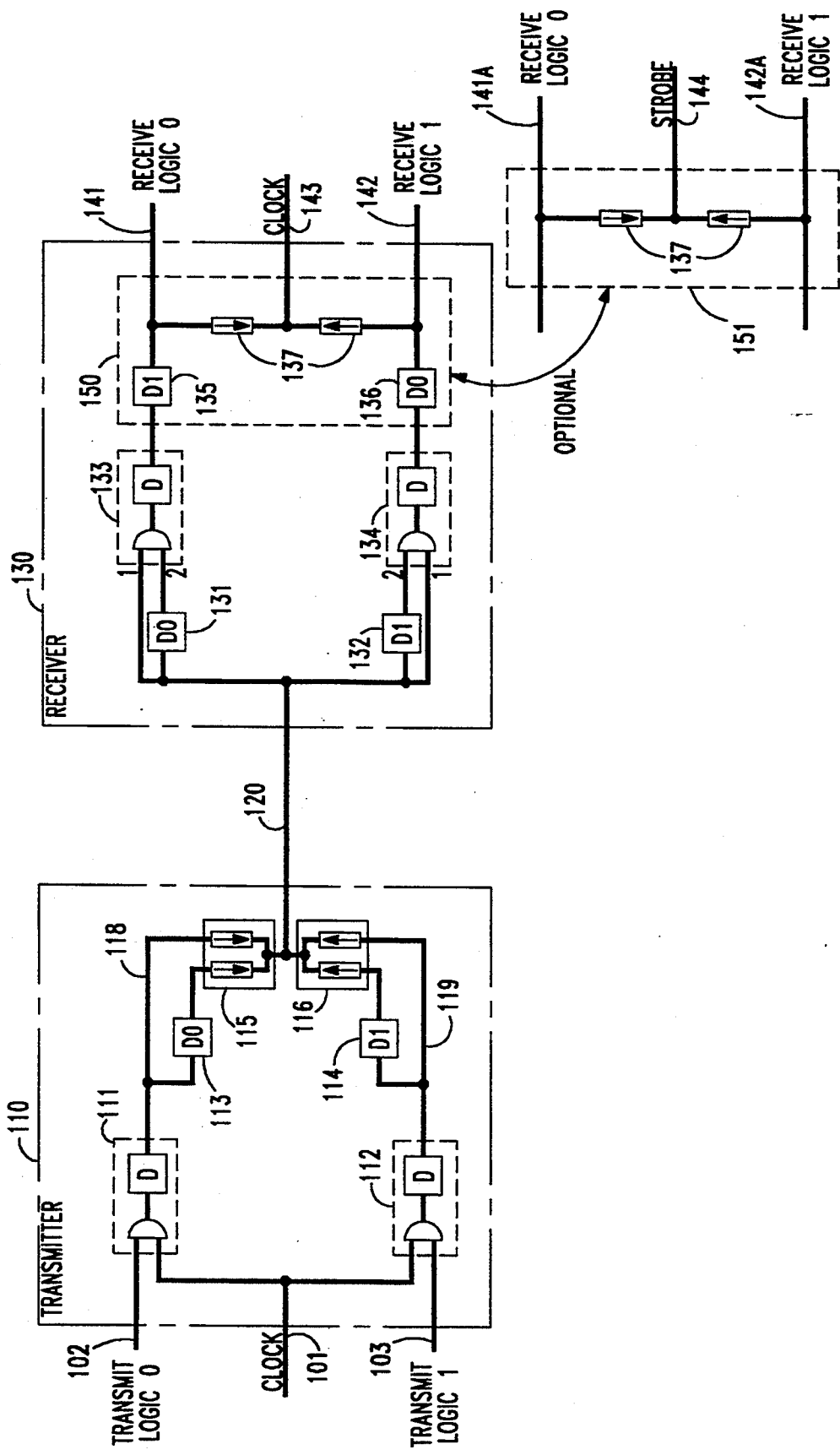
FIG. 1 shows a logic equivalent block diagram of an illustrative communication system including a transmitter and receiver implemented in accordance with the present invention.

Shown in FIG. 1 is a block diagram of an illustrative optical communication system including an optical data transmitter 110 connected over an optical link 120 to an optical data receiver 130. Transmitter 110 is shown to include optical AND gates 111 and 112, optical delay circuits 113 and 114 and optical combining circuits 115 and 116. In the disclosed arrangement, the combining circuits 115 and 116 are implemented using optical isolators connected in a wired-OR configuration. Alternatively, the combining circuits 115 and 116 can be implemented by merely splicing or fusing the optical fibers together.

The optical AND gate 111, optical delay circuit 113 and combining OR circuit 115 provide an arrangement for generating and outputting logical 0 data signals onto optical link or path 120. The optical AND gate 112, delay circuit 114 and optical OR circuit 116 provide an arrangement for generating and outputting logical 1 data signals onto optical link 120.

When a desire to transmit a logical zero is received over input path 102, it is ANDed with a strobe or clock pulse (shown by 331 of FIG. 3) received over path 101. The optical AND gate 111 generates a single pulse delayed by a time D (where D is the inherent delay of AND gate 111) and having the same pulse width as the clock signal. The generated pulse is sent over two paths, over one path the pulse is delayed by an increment of time D0 by delay circuit 113 and over the other path 118 the pulse is communicated without delay. The optical pulse on path 118 and the output of delay circuit 113 are ORed by combining circuit 115 to produce two output pulses which are separated in time by a value D0. With brief reference to FIG. 3 this is shown in 310 where the pulse in time slot T1 is the original clock pulse and the pulse in time slot T3 is the clock pulse delayed by the time D0.

Similarly, when a desire to transmit a logical 1 is received over input link 103, it is ANDed with the clock pulse received over path 101. The optical AND gate 112 generates a single pulse delayed by a time D and having the same pulse width as the input clock signal. The output of optical AND gate 112 is sent over two paths, over one path the pulse is delayed by an increment of time D1 by delay circuit 114 and over the other path 119 the pulse is communicated without delay. The optical pulse on path 119 and the output of delay circuit 114 are ORed by combining circuit 116 to produce two output pulses which are separated in time by a value D1. With reference to FIG. 3, this is shown in 320 where the pulse in time slot T1 is the original clock pulse and the pulse in time slot T5 is the clock pulse delayed by the time D1.

Figure 3:
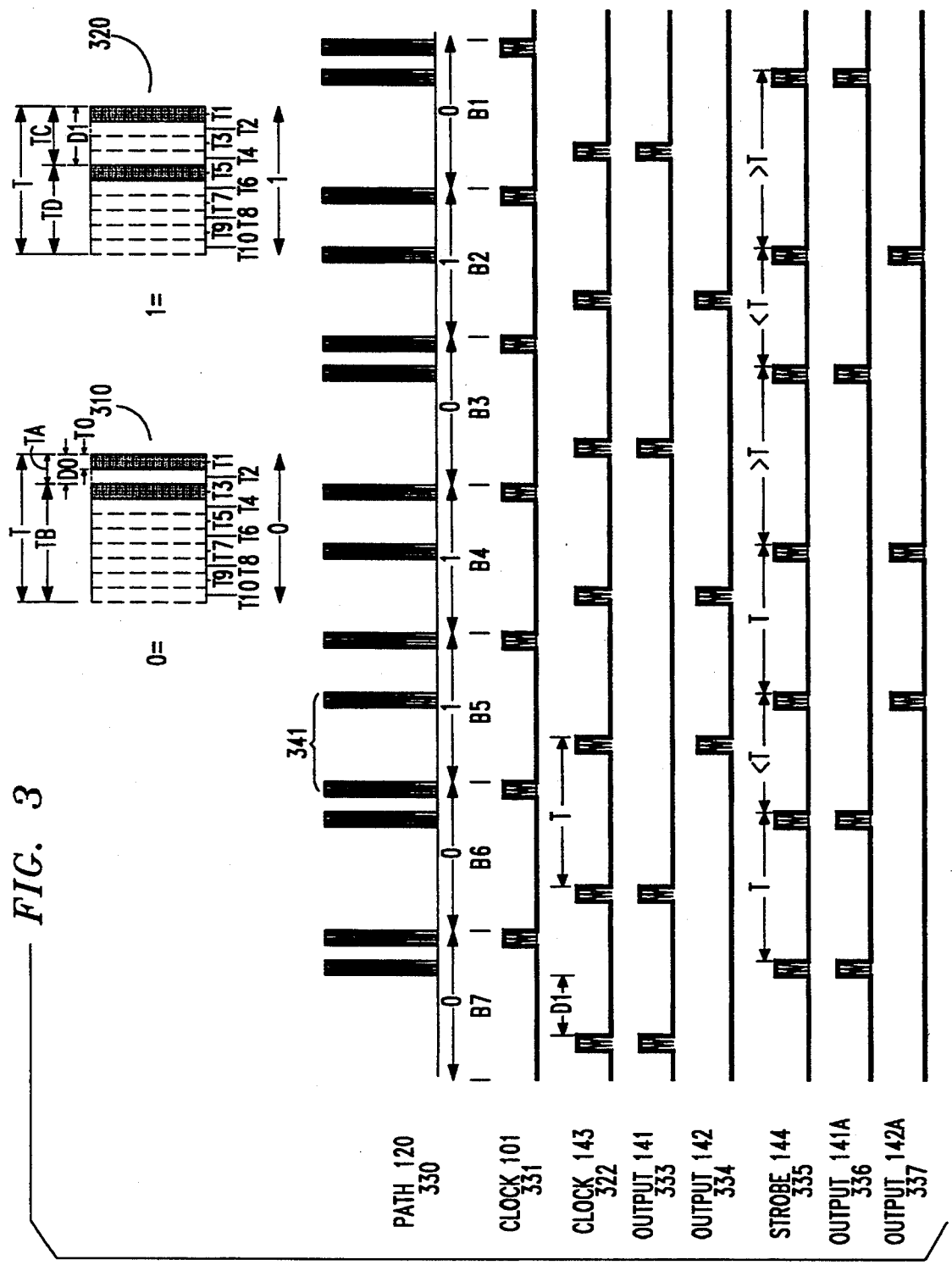
FIG. 3 shows illustrative signal wave forms depicting logical zero and logical one data transmissions which are useful in understanding the present invention.

With reference to 330 of FIG. 3 there is shown the resulting pulse delay encoded data waveform generated by transmitter 110 in response to an input data sequence B1–B6 equal to 0101100. In accordance with the present invention, the data waveform in 330 is decoded by receiver 130 to produce the original input data sequence. The clock signal 101, shown as 331, is used by transmitter 110 to generate data waveform 330. The clock signal 331 and data waveform 330 illustrate a synchronous operating mode of transmitter 110. In a similar manner, transmitter 110 can be operated in an asynchronous mode (not illustrated), by utilizing an asynchronous strobe pulse as clock signal 101 to control when asynchronous data is to be sent.

Returning to FIG. 2 we describe the receiver circuit 130 incorporating the clock recovery circuit 150. The receiver circuit 130 comprises a receive logic 0 and receive logic 1 section. The receive logic 0 section includes optical delay circuit 131 and optical AND gate 133. The receive logic 1 section includes optical delay circuit 132 and optical AND gate 134. Optical data signals, such as shown by 330 of FIG. 3, received over optical path 120.

As will be discussed in more detail in a later paragraph, an optional clock recovery circuit 150, may be utilized in receiver 130 to recover clock signal 143. The circuit 150 includes delay circuit 135 (D1) in the receive logic 0, delay circuit 136 (D0) in the receive logic 1 lead, and combiner circuit 137 which, illustratively, is implemented using optical isolators 137 connected in a wired-OR configuration. The delay circuits (D0) 136 and (D1) 135 are, respectively, the same as delay circuits (D0) 131 and (D1) 132. Clock recovery circuit 150 generates the clock signal 143, shown as 332, from receiver logic 0 output 141, shown as 333, and receiver logic 1 output 142, shown as 334. The clock signal 143, shown as 332, has the same spacing as clock 101 (T seconds in our example).

In a similar manner, an optional strobe recovery circuit may be utilized to recover a strobe signal 144. The circuit 151, illustratively, includes optical isolators 137 connected in a wired-OR configuration. The strobe signal 144, shown as 335, is generated by circuit 151 using receiver logic 0 output 141A, shown by 336, and receiver logic 1 output 142A, shown by 337. Note that the spacing between adjacent strobe pulses may be less than, equal to or greater than T, depending on the logic state of the prior received data bit and the presently received data bit.

The following description makes reference jointly to FIGS. 1 and 3. When a logical 0 data signal is received over path 120, the first optical pulse (in time slot T1 of 310) is applied to input 1 of AND gate 133 and to the input of delay circuit 131. Since this first optical pulse is delayed by delay circuit 131 before it is applied to input 2 of AND gate 133, no output pulse is generated by AND gate 133.

At a time D0 later, the second optical pulse of a logic 0 signal (in time slot T3 of 310) is received over path 120 and applied to the input 1 of AND gate 133 and input of delay circuit 131. At the same time the first optical pulse (from time slot T1 of 310) is outputted by delay circuit 131 and applied to input 2 of AND gate 133. Since AND gate 133 has a pulse at inputs 1 and 2, it generates an output pulse which, after an inherent delay D, is applied to delay circuit 135. The output of delay circuit 135 is connected to combining circuit 137 and outputted on the logical 0 output lead 141. The logic 0 output on lead 141 occurs D+D1 seconds after the second optical pulse (or D+D1+D0 seconds after the first optical pulse) of a logic 0 data signal is received over path 120.

At a time D0 later, the delayed second optical pulse exits delay circuit 131 and is applied to input 2 of AND gate 133. However, since there is no pulse on input 1 of AND gate 133, no pulse is outputted therefrom.

Note that if a logical 1 signal was received over path 120 it also would be applied to AND circuit 133 and delay circuit 131 as well. In a manner similar to that as previously described the pulses in time slots T1 and T5 of 320, representing the logical 1 data signal, are also processed by AND gate 133 and delay circuit 131. However, because the delay circuit 131 delay D0 does not equal the delay D1 between the two pulses which comprise the logic 1 data signal, no output is generated by AND gate 133 in response to a logic 1 data signal applied to its inputs.

When a logical 1 data signal is received over path 120 the first optical pulse, in time slot T1 of 320, is applied to input 1 of AND gate 134 and to the input of delay circuit 132. Since this first optical pulse is delayed D1 by delay circuit 132 before it is applied to input 2 of AND gate 134, no output pulse is generated by AND gate 134. At a time D1 later, the second optical pulse of a logic 1 data signal (in time slot T5 of 320) is received over path 120 and applied to the input 1 of AND gate 134. At the same time the first optical pulse (from time slot T5 of 320) is outputted by delay circuit 132 and applied to input 2 of AND gate 134. Since AND gate 134 has a pulse at input 1 and 2 it generates an output pulse which, after an inherent delay D, is applied to delay circuit 136. The output of delay circuit 136 is connected to combining circuit 137 and outputted on the logical 1 output lead 142. The logic 1 output on lead 142 occurs D+D0 seconds after the second optical pulse (or D+D0+D1 seconds after the first pulse) of a logic 1 data signal is received over path 120. At a time D1 later, the delayed second optical pulse exits delay circuit 132 and is applied to input 2 of AND gate 134. However, since there is no pulse on input 1 of AND gate 134, no pulse is outputted therefrom.

Note, that if a logical 0 signal was received over path 120 it also would be applied to AND circuit 134 and delay circuit 132 as well. In a manner similar to that as previously described the pulses in time slots T1 and T3 of 310, representing the logical 0 data signal, are also processed by AND gate 134. However, because the delay in circuit 132 delay D1 does not equal the delay D0 between the two pulses which comprise the logic 0 data signal, no output is generated by AND gate 134 in response to a logic 0 data signal applied to its inputs.

The data signals on paths 141 and 142 are ORed by combining circuit 137 to recover or generate an output strobe or clock pulse (shown by 331 of FIG. 3) which is outputted over link 143. Note since the logic 0 and logic 1 signals are both delayed by D+D0+D1 from their leading pulse, the generated clock pulse has a uniform period.

In accordance with the present invention the two pulses which represent the logic 0 and logic 1 signals are sent within the time interval T. In the illustrated arrangement the time interval T includes ten time slots (T1-T10). As previously discussed the logic 0 signal has a pulse in time slots T1 and T3 and the logic 1 signal has a pulse in time slots T1 and T5. While the time separation between the pulses of a logic 0 and logic 1 signals can be varied certain relationships must exist to insure the proper operation of the transmitter and receiver circuits. For example, the time period TA (delay D0) for our illustrative logic 0 signal may be greater than or equal to the pulse width of a received data pulse T0. When TA is equal to pulse width T0, the two pulses of the illustrated logic 0 signal 310 would become one pulse (not shown) having a width 2 T0. The time period TC (delay D1) for our illustrative logic 1 signal must be greater than TA. The time period TB and TD must both be greater than the maximum of either TA or TC. Thus, the time period between adjacent clock pulses (T) or data strobe pulses should be greater than twice TC. This requirement insures that pulse pair, e.g., 341, formed from the second pulse of a prior logic data bit (B5) and the first pulse of a present logic data bit (B6) is not construed as a valid logic 0 (310) or logic 1 (320) data bit. In an synchronous communication system TA+TB and TC+TD must be equal to the time period T. In an asynchronous data bit transmission system, while there is no requirement that data strobe occur at a fixed period T, the time period between strobe pulses should be greater than twice TC.

Figure 2:
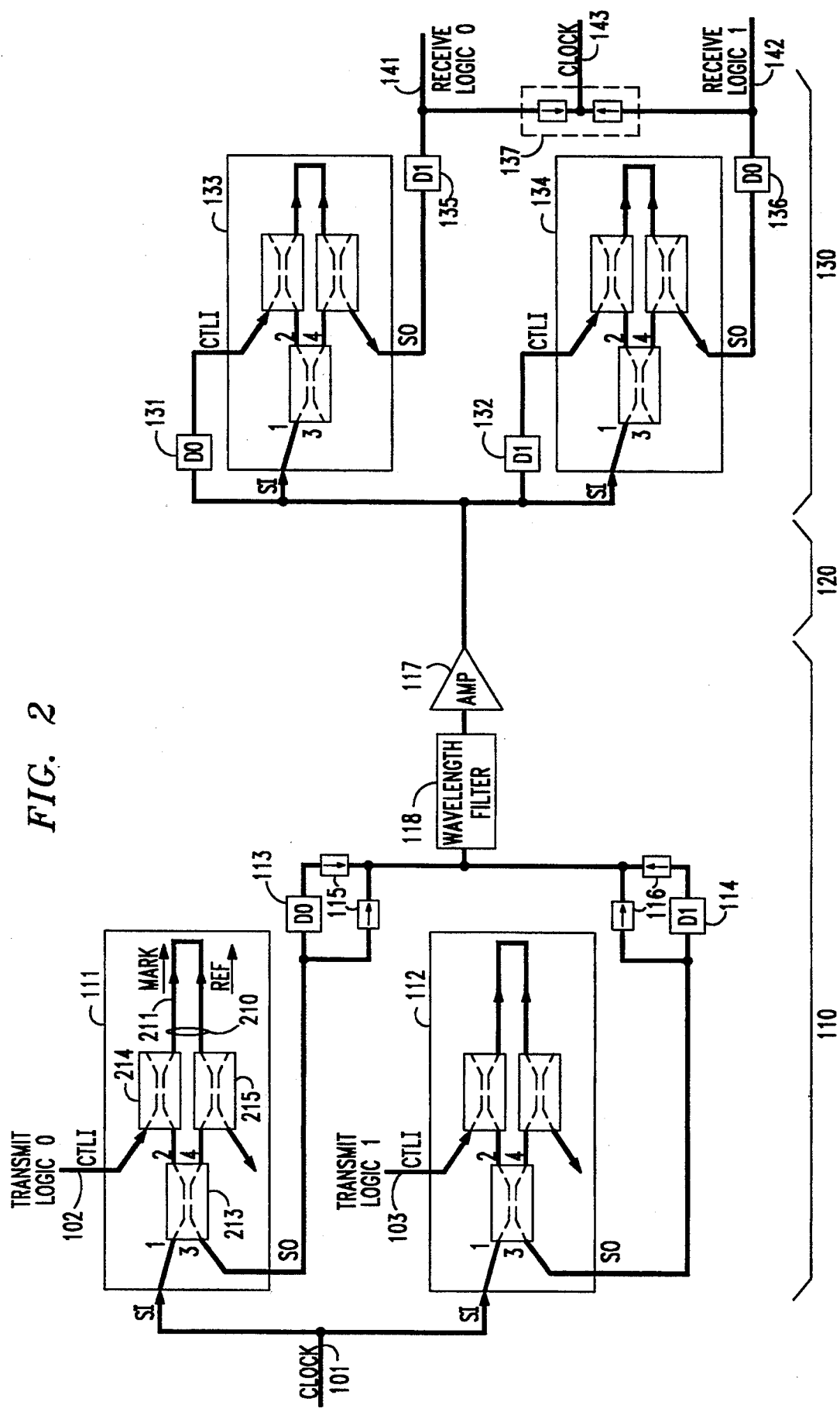
FIG. 2 shows an optical circuit implementation of the various blocks of the optical communication system of FIG. 1.

With reference to FIG. 2, we describe an illustrative all optical circuit implementation of transmitter 110 and receiver 130. Optionally, a well-known wavelength filter 118 may be used to prevent unwanted optical signals from being transmitted from transmitter 110. The optical amplifier 117 (e.g., an erbium amplifier) amplifies the optical signal to a proper level for transmission over optical link 120 to receiver 130. In transmitter 110 and receiver 130, the optical AND gates 111, 112, 133 and 134 are, illustratively, implemented as Sagnac switches. The delay circuits 113, 131 and 136 are illustratively implemented in a well-known manner using a length of optical fiber necessary to create the delay D0. Similarly, the delay circuit 114, 132 and 135 are, illustratively, implemented using a length of optical fiber necessary to create a delay D1. The OR gates 115, 116 and 135 are implemented using well-known directional couplers.

The operation of a Sagnac switch which may be utilized in the present invention is described in detail in the co-pending United States patent application Ser. No. 07/521774 of Gabriel, Houh and Whitaker entitled "Sagnac Optical Logical Gate," filed May 10, 1990, which is incorporated by reference herein. Since all of the Sagnac switches utilized in the present invention operate in the same manner, I will describe only the operation of the Sagnac switch which implements AND gate 111 (referred to hereinafter as Sagnac switch 111).

Sagnac switch 111, illustratively, includes an optical transmission medium, i.e., optical fiber 210 including an enhanced variable refractive-index segment 211, connected at both ends to a Polarization Maintaining Coupler (PMC) 213. An input optical clock signal is applied to an input SI which is port 1 of coupler 213. Ports 2 and 4 of coupler 213 are connected to the two ends of fiber 210 and port 3 of coupler 210 forms an output SO of the Sagnac loop. Fiber 210 thus forms a loop, (also referred to herein as fiber loop 210) which in the context of this disclosure, refers to the path over which a signal travels and, more particularly, to arrangements where the path forms a closed, or nearly closed, figure.

The Sagnac switch 111 operates as follows. Clock signal is applied to port 1 and is split into two parts that exit coupler 213 at ports 2 and 4: a "mark" signal that travels clockwise, and a "ref" signal (reference signal) that travels counter-clockwise. The "mark" and "ref" signals travel through the loop in opposite directions, re-enter coupler 213 and recombine therein. Under normal circumstances, the "mark" and "ref" signals experience the same conditions as they travel through the loop. Even though the propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the signals traveling in the two directions. The result is a combining of signals in coupler 213 that is constructive with respect to port 1 and destructive with respect to port 3. In consequence, light that enters port 1 of coupler 213 is completely reflected back to port 1, and no output is delivered to port 3. The above paragraphs describe the operation in the absence of a control signal at port CTLI.

In addition to the above-described structure, Sagnac switch 111 includes a wavelength combining coupler 214 that injects a control signal (transmit logic 0 signal 102 in our example) at port CTLI into a segment 211 of the fiber loop 210. Because coupler 214 is within loop 210, the control signal travels along loop 210 only in one direction; and more specifically, coupler 214 is arranged to inject the control signal that travels along loop 210 in the direction of the "mark" signal. A wavelength combining coupler 215 may also be included within the loop of fiber 210 to extract the control signal (transmit logic 0 signal 102) out of the loop once it has served its control function.

Segment 211 of fiber loop 210 is a variable refractive-index material that is characterized by the property that the propagation speed of a beam passing through the material is a function of the intensity of the beam that passes through the material. While this property exists in all optical fibers, some optical fibers have been manufactured to enhance the variable refractive-index characteristic. Furthermore, not only does the propagation speed change for the beam (e.g., control signal) that effects the change in propagation speed, but it also changes the propagation speed of other beams (e.g., "mark" signal) that pass through the material at the same time. The nonlinear interaction between the control signal and the "mark" signal is by means of cross-phase modulation due to the optical Kerr effect. Of course, the entire length of fiber 210 may be made of such a variable refractive-index material, but for the sake of generality, fiber 210 is drawn as having only a limited segment 211 being made up of this material. Also for the sake of generality, it should be pointed out that the loop of fiber 210 does not necessarily have to be fiber. It can be a waveguide, or other means for directing the flow of light.

In sum, the Sagnac switch 111 includes a fiber loop 210 having a controllable propagation speed material in segment 211, "mark" and "ref" signals traveling through the loop in opposite directions and combined in coupler 213 and a control signal (logic 0 signal) that is injected at coupler 214 which travels in the same direction as the "mark" signal over segment 211 and extracted by coupler 215. When the control signal is not present, the "mark" and "ref" signals are combined in coupler 213 as described above. The signal entering the switch at port 1 reflects out of the loop of fiber 210 and exits port 1 of coupler 213. However, when the control signal (transmit logic 0 signal 102) is present and is made to travel through segment 211 with the "mark" signal, the change in propagation speed of the "mark" signal that is caused by the control signal alters the phase of the "mark" signal arriving at coupler 213. When the energy in the control signal and the interaction interval within segment 211 (between the "mark" and control signals) are properly controlled, the resulting phase relationship between the "mark" and "ref" signals is approximately $\pi$ radians, meaning that the "mark" signal is about 180° out-of-phase to the "ref" signal. This causes the combining of the "mark" signal and the "ref" signal in coupler 213 to be completely destructive with respect to port 1 and completely constructive with respect to port 3. As a result, all of the energy exits at port 3 (non-reflected signal output port) rather than at port 1 (reflected signal output port). Thus, the output of port 3 is the logical ANDing of the clock pulse and control pulse (transmit logic 0 signal 102). Hence, Sagnac switch 111 output SO is the logical ANDing of the inputs at SI and CTLI.

It may be noted in passing that the "ref" signal also passes through segment 211 and that its speed is also somewhat affected by the control signal. But, since the control signal and the "ref" signal travel in opposite directions, their interaction time is much shorter than the interaction time of the "mark" and the control signals.

To ensure the proper operation of the Sagnac switch, that is to minimize the degradation (such as clipping, etc.) of the pulse which outputs at port 3, requires that the control signal (logic 0 signal 102) completely traverse the "mark" signal during its transit through segment 211 of the fiber loop 210. This is accomplished by requiring the material of segment 211 to have a dual speed characteristic, one that propagates the control signal at a different rate than the "mark" (clock) signal. The difference in the propagation speed may be tied to any controllable parameter of the control signal, such as wavelength, intensity or polarization. In the illustrative embodiment different wavelengths are utilized. That is, the wavelength of clock signal ($\lambda 1$) is different than the wavelength ($\lambda 2$) of the control signal (transmit logic 0 signal 102).

As long as the control signal completely traverses the "mark" signal within segment 214 the Sagnac switch operation is completely insensitive to the shape of the control signal or its precise timing. Rather, it is only sensitive to the overall energy of the control signal (integral of the control pulse).

Segment 211 is selected to have a controllable parameter based on wavelength; thus, fiber loop 210 has a dispersive characteristic. The wavelength of the control signal is selected to be at a wavelength which transits segment 211 at a travel speed which is different from the speed for the wavelength of clock signal. The control signal wavelength and the clock signal wavelength are chosen with the fiber dispersion to give sufficient differential travel speed such that the control and clock pulses completely traverse one another over the length of fiber 211. For example, we assume that the control signal is selected to be at the "fast" wavelength; hence, the clock signal must enter the loop 210 first. Thus, the control signal can traverse or "slip" past the "mark" signal within the length of segment 211, even though the "mark" signal precedes the entrance of the control signal into segment 211. In a similar manner, the clock signal may be at the "fast" wavelength so that the "mark" signal traverses or "slips" by the slower control signal. In such an arrangement the control signal should precede the entrance of the mark signal into segment 211.

What has been described is merely illustrative of the application of the principles of the present invention. Other arrangements and methods can be implemented by those skilled in the art without departing from the spirit and scope of the present invention.

I claim:

1. An optical data transmitter, comprising
   first optical circuit means, responsive to a first input signal, for generating and transmitting a first symbol having a first and a second optical pulses representing said first input signal, said second pulse occurring a first predetermined time after said first pulse;
   second optical circuit means, responsive to a second input signal, for generating and transmitting a second symbol having a third and a fourth optical pulses representing said second input signal, said fourth pulse occurring a second predetermined time after said third pulse; and
   means for controlling the transmission of said first and second symbols so that the time between symbol transmission is greater than either said first or second predetermined time.

2. The transmitter of claim 1 wherein
   said first predetermined time is equal to the pulse width of said first optical pulse.

3. The transmitter of claim 1 wherein
   said first means is responsive to a received clock pulse for generating said first pulse and
   said second means is responsive to said received clock pulse for generating said third pulse.

4. The transmitter of claim 3 wherein said received clock pulses occur at a clock frequency rate which has a period which is greater than twice the maximum of said either first or second predetermined times.

5. The transmitter of claim 1 wherein
   said first and second optical pulses of said first symbol have a time separation TA, where TA is greater than or equal to the width of said first pulse;
   said third and fourth optical pulses of said second symbol have a time separation TC, where TC is greater than TA; and
   said first and second symbols having a time separation T therebetween which is greater than twice the maximum of either said TA or TC.

6. The transmitter of claim 1 wherein said first and third pulses occur during a first time slot of a predefined time interval having a number of time slots, wherein said second and fourth pulses occur during different other time slots, of said interval, and wherein
   the number of time slots in said interval is equal to or greater than one less than twice the time slot number either said second or fourth pulse.

7. The transmitter of claim 6 wherein said first pulse occurs in slot one, said second pulse occurs in time slot three, said third pulse occurs in time slot one and said fourth pulse occurs in time slot five.

8. The transmitter of claim 1 wherein
   said first and second optical circuit means each include an optical Sagnac switch arranged as an optical AND gate having an input port (SI) for receiving clock signals, a control port (CTLI) for receiving an input signal, and an output port (SO).

9. The transmitter of claim 8 wherein
   said first and second optical circuit means each include a two input optical combining circuit, one input connected to a Sagnac switch output port (SO) and a second input connected through an optical delay means to said Sagnac switch output port (SO), wherein
   said optical delay means associated with said first optical circuit means has a time delay equal to said first predetermined time and wherein
   said optical delay means associated with said second optical circuit means has a time delay equal to said second predetermined time.

10. The transmitter of claim 9 wherein said optical combining circuit is an optical wired-OR circuit.

11. An optical data transmitter comprising means responsive to a first input signal, for sending a clock pulse signal followed by a clock pulse signal delayed by a first predetermined time interval (D0), means, responsive to a second input signal, for sending a clock pulse signal followed by a delayed clock pulse signal delayed by a second predetermined time interval (D1), and means for transmitting clock pulses at a third predetermined time interval T, where T is greater than twice either D0 or D1.

12. An optical data transmitter for transmitting optical pulses in a multiple time slot interval, comprising first means, responsive to a first input signal, for generating and transmitting a first and a second pulse representative of said first input signal during different time slots of said multiple time slot interval, said first pulse occurring during a first time slot and said second pulse occurring during a first unique subsequent time slot and second means, responsive to a second input signal, for generating and transmitting during said multiple time slot interval a first and a second pulse representative of said second input signal, said first pulse occurring during said first time slot and said second pulse occurring during a second unique subsequent time slot, and.

wherein the number of time slots in said multiple time slot interval is selected to be at least one less than twice the number of time slots utilized by either said first or second means.

13. An optical data transmitter comprising first means, responsive to a first input signal, for generating and transmitting a first binary optical signal including two pulses having a first optical intensity level and occupying a first predetermined time period, second means, responsive to a second input signal, for generating and transmitting a second binary optical signal including two pulses having said first occupyingoptical intenssity level and occupying a second a second predetermined time period, and means for controlling a third predetermined time period between said first and second optical signals to be greater than said first or said second predetermined time period.

14. The transmitter of claim 13 wherein the two pulses of said first and second optical signals are pulse pairs each having a different predetermined time period between the pulses.

15. The transmitter of claim 14 wherein one pulse of each pulse pair transmitted from said first and said second means is generated in response to a received clock pulse.

16. An optical data receiver comprising means for periodically receiving an optical pulse at a first predetermined time interval (T) and for outputting said optical pulse as a received clock pulse, means for receiving an optical pulse following said received clock pulse by a second predetermined time interval (TA) and, in response thereto, for outputting a first optical output signal, means for receiving an optical pulse following a received clock pulse by a third predetermined time interval (TC) and, in response thereto, for outputting a second optical output signal, and wherein said first predetermined time interval is greater than twice either of said second or third time interval.

17. An optical data receiver for receiving pairs of optical signals over an optical path comprising first optical circuit means for receiving a first pair of optical pulses having a first predetermined time period therebetween and, in response thereto, for generating a first output signal, second optical circuit means for receiving a second pair of optical pulses having a second predetermined time period therebetween and, in response thereto, for generating a second output signal, and wherein the time spacing between the reception of consecutive optical signal pairs is greater than either said first or second predetermined time period.

18. The receiver of claim 17 wherein said first means includes an optical Sagnac switch arranged as an optical AND gate having an input port (SI) connected to said optical path and a control port (CTLI) connected to said optical path through a first optical delay means having a delay equal to said first predetermined time and said second means includes an optical Sagnac switch arranged as an optical AND gate having an input port (SI) connected to said optical path and a control port (CTLI) connected to said optical path through a second optical delay means having a delay equal to said second predetermined time.

19. The receiver of claim 17 including third optical circuit means for combining said first and second output signals to produce an output control signal.

20. The receiver of claim 19 wherein said third means includes third optical delay means for delaying applying said first output signal to said third means by said second predetermined time and fourth optical delay means for delaying applying said second output signal to said third means by said first predetermined time.

21. An optical communication system comprising a transmitter including first means, responsive to a first input signal, for generating and transmitting a first pair of optical pulses having a first predetermined time period therebetween, second means, responsive to a second input signal, for generating and transmitting a second pair of optical pulses having a second predetermined time period therebetween, and third means for controlling the transmitting of said first and second pulse pairs so that the time therebetween is greater than either said first or said second time period and a receiver including first means for receiving said first pair of optical pulses and for generating, in response thereto, a first output signal and second means for receiving said second pair of optical pulses and for generating, in response thereto, a second output signal.

22. The system of claim 21 wherein said third transmitter means includes means for receiving a clock pulse and wherein said first transmitter means is responsive to a received clock pulse and said first input signal for generating a first pulse of said first pulse pair and said second transmitter means is responsive to said received clock pulse and said second input signal for generating a first pulse of said second pulse pair.

23. The system of claim 21 wherein said first pulse of each pulse pair occurs during a first time slot of a predefined time interval having a number of time slots, wherein a second pulse of each pulse pair occurs during different other time slots of said interval, and wherein the number of time slots of said interval is at least one less than twice the greater time slot number of the second pulse of either the first or second pulse pair.

24. The system of claim 21 wherein said receiver includes
optical circuit means for combining said first and second output signals to produce an output clock signal.

25. The system of claim 21 wherein said first and second transmitter means include Sagnac switches.

26. The system of claim 21 wherein said first and second receiver means include Sagnac switches.

* * * * *